Oct. 4, 1927.
H. S. BILDERBACK
SNAP HOOK
Filed Feb. 9, 1927
1,644,168
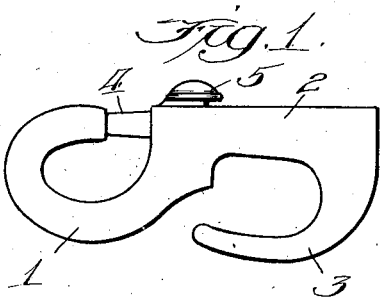
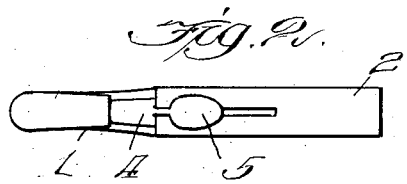
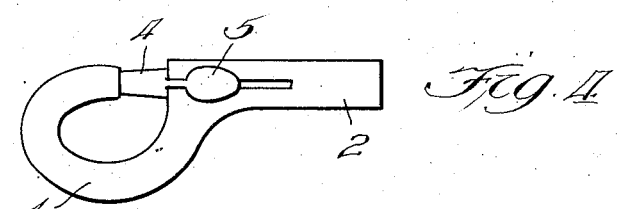
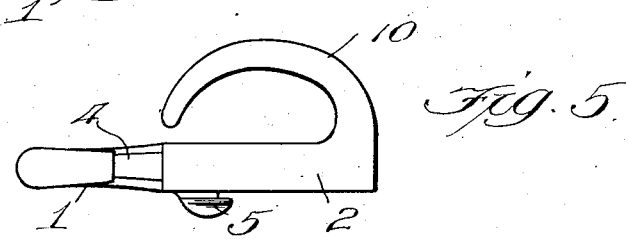
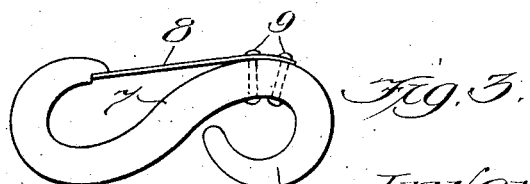
Inventor:
H. S. Bilderback,
by Wm. G. Freudenreich,
Atty Patented Oct. 4, 1927.

1,644,168

UNITED STATES PATENT OFFICE.

HENRY S. BILDERBACK, OF ELK CITY, OKLAHOMA.

SNAP HOOK.

Application filed February 9, 1927. Serial No. 167,064.

The present invention has for its object to produce a snap device, comprising a snap hook and a loop or hook to be more or less permanently fastened to a cable, strap or chain, which shall be simple and compact and be so shaped and proportioned as to present a minimum length for a given weight.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation; Fig. 2 is an edge view of a device arranged in accordance with my invention; Fig. 3 is a side elevation of a modified form of device; and Figs. 4 and 5 are side and top views of a still further form of the invention.

Referring to Figs. 1 and 2 of the drawing, 1 represents a hook of any usual or suitable construction. From one end of the hook projects a straight shank 2 lying at right angles to the portion of the hook immediately adjacent thereto. What may be termed the free end of the shank is merged into a curved part 3 lying on the same side of the shank as does the hook and extending forwardly toward the hook. The part 3 therefore forms with the rear part of the hook and the shank a loop that may be closed or open, as shown. The various elements are so proportioned that a straight line passing through the centers of the hook and the loop, respectively, lies substantially parallel to the shank. Therefore, when the device forms a connecting link between two members, any pull that is exerted thereon will be in a direction substantially parallel to the shank.

Any suitable retainer for the hook may be employed. In the arrangement shown, there is the bolt 4 slidable in the shank and provided with a head or button 5 for moving the same. It will be seen that without making the device any longer than the combined lengths of the hook and the loop, there is obtained a long shank capable of receiving an adequate retaining bolt and a comparatively long spring therefor.

It will thus be seen that I have produced a device of minimum length, because the hook and loop are placed side by side, one arm or side of the hook forming also one side of the loop. Furthermore, my improved device possesses extreme simplicity of operation, because the loop and the closing device of the hook end lie on opposite sides of the shank and neither interferes with the other.

In Figure 3 the device is made of a single rod or bar bent into an S-shape; the loop 6 having the inner side formed of the piece 7 that constitutes a part of the hook. The hook closer or keeper 8 is a flat spring extending across the opening in the hook and secured to the loop, as indicated at 9, between the center of the loop and the corresponding end of the device. The hook and the loop may be said to overlap each other.

In Figs. 4 and 5 the arrangement is the same as shown in Figs. 1 and 2, excepting that the loop 10 is swung around through an angle of ninety degrees with respect to the long axis of the stem or shank 2, from the position shown in Figs. 1 and 2. In other words, the hook and the loop lie in planes at right angles to each other.

While I have illustrated and described with particularity only a few preferred forms of my invention, I do not desire to be limited to the exact structural details thus illustrated and described; but intend to cover all forms and arrangements which come within the definitions of my invention constituting the appended claims.

I claim:

1. A body member for a snap hook device comprising a hook, a straight shank joined to one end of the hook and lying at right angles to said end, and said shank being merged into and forming part of a loop lying directly behind and closed at the front end by said hook.

2. A device of the character described comprising a hook, a straight shank connected to one end of the hook and extending at right angles thereto, a bolt slidable in said shank and normally projecting across the opening in the hook, said shank terminating in a part forming with the same and the rear side of the hook a loop, the parts being so proportioned that a line containing the centers of the hook and the loop is approximately parallel with said shank.

In testimony whereof, I sign this specification.

HENRY S. BILDERBACK.